United States Patent [19]

Buehler et al.

[11] Patent Number: 4,844,116

[45] Date of Patent: Jul. 4, 1989

[54] QUARTER TURN WATER HYDRANT

[75] Inventors: Stephen L Buehler, Deatsville; Jeffrey L. Donaldson, Prattville, both of Ala.

[73] Assignee: Jay R. Smith MFG. Co., Montgomery, Ala.

[21] Appl. No.: 179,248

[22] Filed: Apr. 8, 1988

[51] Int. Cl.$^4$ .......................... F16L 5/00; F16K 51/00
[52] U.S. Cl. ................ 137/360; 137/625.31; 251/288; 251/292
[58] Field of Search ............. 137/625.31, 625.32, 137/360; 251/286, 288, 292

[56] References Cited

U.S. PATENT DOCUMENTS

| | | | |
|---|---|---|---|
| 1,047,067 | 12/1912 | Jones | 137/299 |
| 1,937,302 | 11/1933 | Volkhardt | 137/13 |
| 2,687,141 | 8/1954 | Baker | 137/360 |
| 3,158,170 | 11/1964 | Tubbs | 137/218 |
| 3,424,189 | 1/1969 | Woodford | 137/218 |
| 3,807,455 | 4/1974 | Farrell | 137/625.31 |
| 3,831,621 | 8/1974 | Anthony et al. | 137/625.31 |
| 3,952,770 | 4/1976 | Botnick | 137/360 |
| 4,644,970 | 2/1987 | Lowry | 137/360 |

FOREIGN PATENT DOCUMENTS 5552 of 1900 United Kingdom ........... 137/625.31

Primary Examiner—A. Michael Chambers
Attorney, Agent, or Firm—Fleit, Jacobson, Cohn, Price Holman & Stern

[57] ABSTRACT

A water hydrant specifically adapted for use in domestic and non-domestic water systems for commercial, institutional and residential use with the water hydrant including a unique valve structure incorporating ceramic components and a unique actuating structure requiring only a quarter turn of a valve operator in order to move the valve from a fully open to a fully closed position. The valve operating mechanism includes an elongated operating rod extending through a casing installed in a wall of a building and having a fitting for a garden hose. The valve structure itself includes a valve body having an arcuate slot-like structure therein to receive a projection on the valve actuator to limit the rotational movement to one-quarter turn when moving the valve components from fully open to fully closed position. The valve components include a stationary ceramic disk and a rotatable ceramic disk having structural components that will establish a flow path for water and stop or cut off a flow path with the ceramic elements eliminating the problem of a valve of this type becoming frictionally locked due to non-use over long periods of time inasmuch as the ceramic disks include lapped flat surfaces which are in effect self-lubricated for ease of operation and greatly reduced operating friction even at elevated water pressures thereby providing a water hydrant that is effective in use, easy to operate and not subject to jamming or locking during long periods of non-use or infrequent use.

8 Claims, 2 Drawing Sheets

U.S. Patent  Jul. 4, 1989  Sheet 1 of 2  4,844,116
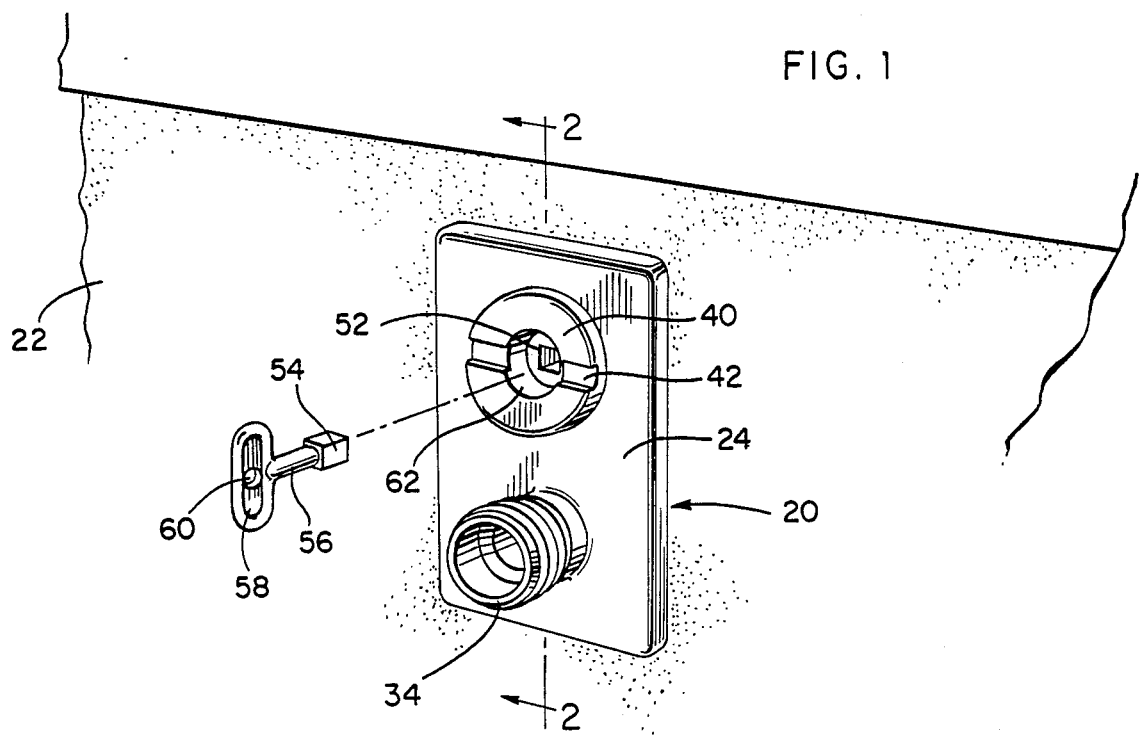
FIG. 1
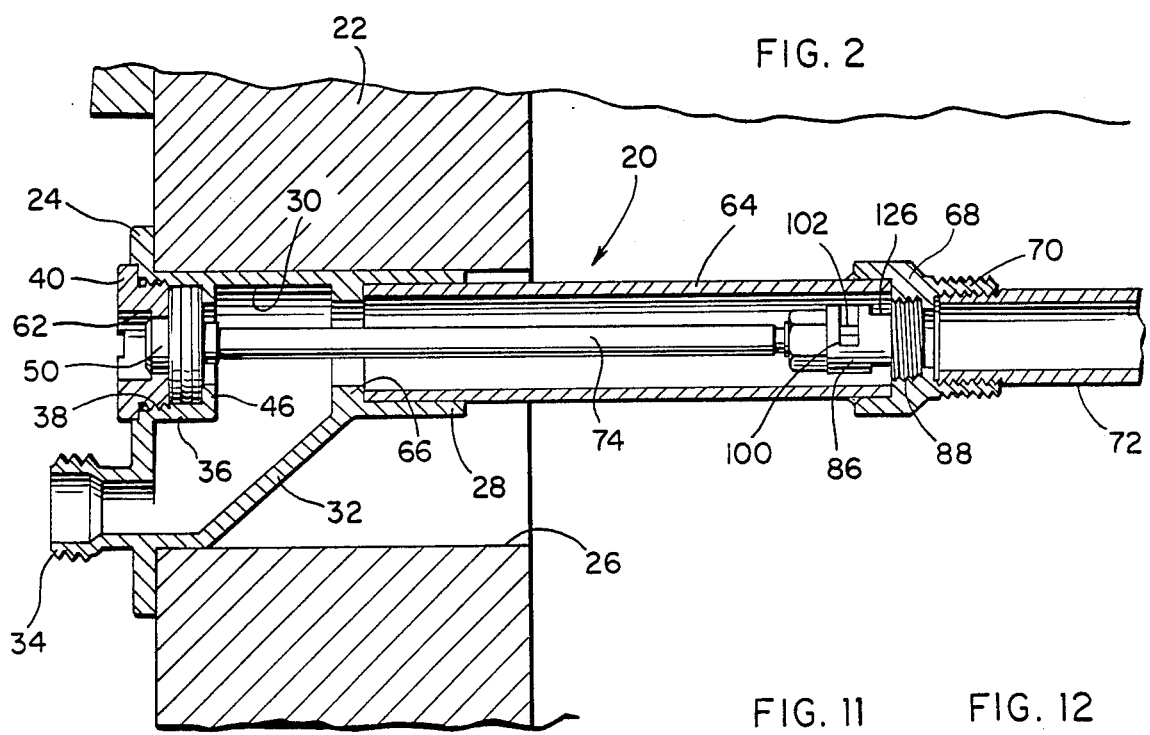
FIG. 2
FIG. 7  FIG. 8  FIG. 9
FIG. 11  FIG. 12
FIG. 10  FIG. 13

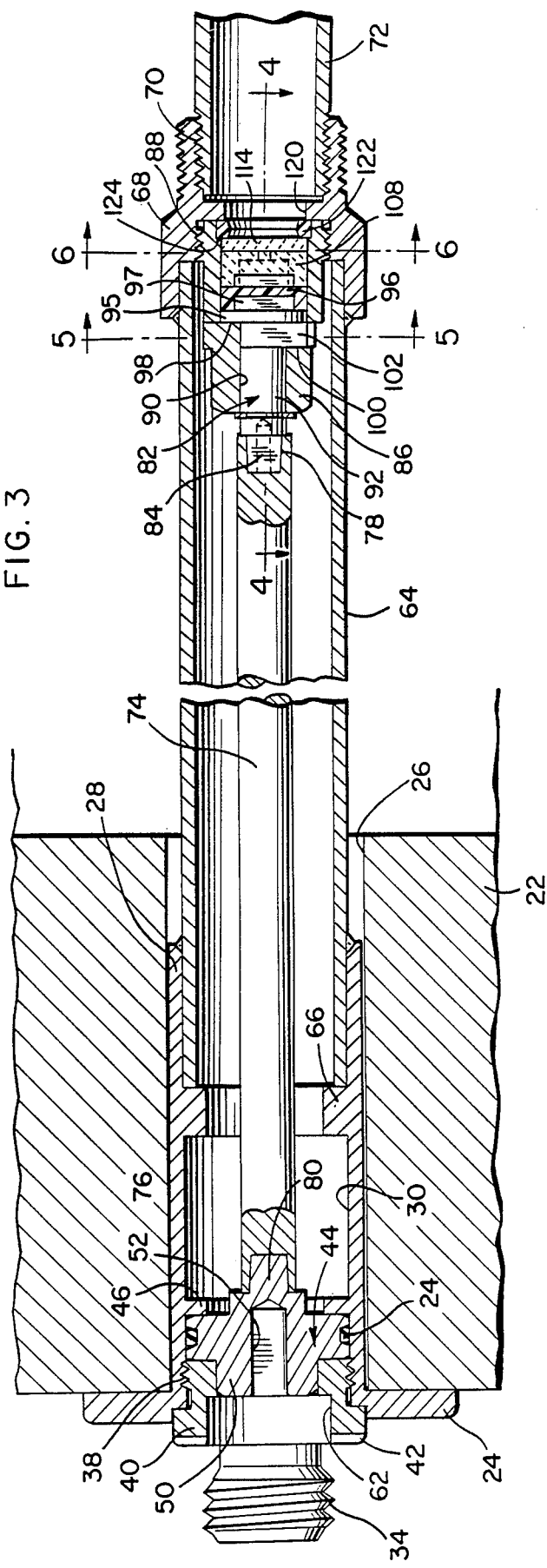

QUARTER TURN WATER HYDRANT

BACKGROUND OF THE INVENTION

FIELD OF THE INVENTION

The present invention generally relates to a water hydrant and more particularly to a water hydrant specifically adapted for use in domestic and non-domestic water systems for commercial, institutional and residential use with the water hydrant including a unique valve structure incorporating ceramic components and a unique actuating structure requiring only a quarter turn of a valve operator in order to move the valve from a fully open to a fully closed position. The valve operating mechanism includes an elongated operating rod extending through a casing installed in a wall of a building or the like with a unique housing structure being provided that incorporates a face plate and a fitting for a garden hose. The valve structure itself includes a valve body having an arcuate slot-like structure therein to receive a projection on the valve actuator to limit the rotational movement to one-quarter turn when moving the valve components from fully open to fully closed position. The valve components include a stationary ceramic disk and a rotatable ceramic disk having structural components that will establish a flow path for water and stop or cut off a flow path with the ceramic elements eliminating the problem of a valve of this type becoming frictionally locked due to non-use over long periods of time inasmuch as the ceramic disks include lapped flat surfaces which are in effect self-lubricated for ease of operation and greatly reduce operating friction even at elevated water pressures thereby providing a water hydrant that is effective in use, easy to operate and not subject to jamming or locking during long periods of non-use or infrequent use.

INFORMATION DISCLOSURE STATEMENT

Various types of valve structures are known which utilize less than multiple rotational movement of an operating handle in order to actuate the valve. Typical of such valves is the conventional plug-type valve in which the body of the valve has a through passage that is either aligned with or misaligned with the flow path in adjacent pipes. However, such valves are not successfully used as a water hydrant since it is desirable for the valve structure to be remote from the discharge point. Other valve structures have been provided for use in water hydrants in which the valve structure is remote from the operator but such structures do not incorporate the unique features employed in the present invention.

SUMMARY OF THE INVENTION

Frequently, water hydrants are installed in various structures for various uses such as lawn maintenance, washdown of building exterior components, driveways, patios and the like, washing vehicles and other equipment and for various other purposes. Water hydrants are frequently installed on the exterior of a structure which expose the working components to the environmental elements and subject the working components to high temperatures, low temperatures and infrequent use since the hydrants may not be a constantly or frequently used item. Water hydrants of typical construction also are constructed frequently of non-ferrous metals and, due to infrequent use, the sealing components of the valve may become corroded thus rendering the hydrant inoperable. A water hydrant has a specific function and purpose and is not similar to faucets that are used in sinks, washbasins or shutoff valves in water lines and the like.

Accordingly, an object of the present invention is to provide a water hydrant having a valve structure with sealing components in the form of composite ceramic disks which provides ease of lubrication since the facing surfaces and engaging surfaces of the ceramic disks are lapped or optically flat and thus are self-lubricated for ease of operation even where hydrants remain dormant for long periods of time or are used infrequently, they still are easily activated and operated. In addition, the lapped flat surfaces of the layered ceramic seals greatly reduce operating friction even at elevated water pressures and the structure includes a combination elastomeric thrust washer and floating rod assembly which aids in the reduction of hydrostatic shock or "water hammer".

Another object of the invention is to provide a water hydrant that requires only a single one-quarter turn of an operating key or other operating mechanism to move the valve components between fully open and fully closed positions with the key enabling easy and secure operation of the water hydrant and being constructed in a manner to prevent casual operation of the water hydrant by unauthorized persons.

A further object of the present invention is to provide a quarter turn water hydrant in accordance with the preceding objects which establishes effective user convenience and provides a valve structure that is easy to operate and can be operated easily even during periods of non-use or infrequent use and extends the operational life of the valve substantially beyond prior art water hydrant valve structures utilizing conventional metallic materials.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the exterior wall of a building illustrating the water hydrant of the present invention installed therein.

FIG. 2 is a vertical, sectional view taken substantially upon a plane passing along section line 2—2 on FIG. 1 illustrating the structural details of the water hydrant of the present invention illustrating its association with the building wall and supply pipe.

FIG. 3 is a longitudinal, sectional view of the water hydrant, on an enlarged scale, illustrating the specific structural details of the components of the valve.

FIG. 4 is a detailed, sectional view taken substantially upon a plane passing along section line 4—4 on FIG. 3, illustrating further structural details of the valve body and rotatable and non-rotatable components of the valve structure.

FIG. 5 is a transverse, sectional view taken substantially upon a plane passing along section line 5—5 on FIG. 3 illustrating the structure of a stop mechanism for limiting rotational movement of the operating mechanism.

FIG. 6 is a transverse, sectional view taken substantially upon a plane passing along section line 6—6 on FIG. 3 illustrating further structural details of the valve body and associated valve components.

FIG. 7 is an elevational view of the rotatable ceramic disk.

FIG. 8 is a sectional view taken along section line 8—8 of FIG. 7 illustrating structural details of the rotatable ceramic disk.

FIG. 9 is a plan view of the fixed ceramic disk.

FIG. 10 is a transverse, sectional view taken along section line 10—10 on FIG. 9 illustrating further structural details of the fixed ceramic disk.

FIG. 11 is an elevational view of the plastic thrust washer.

FIG. 12 is an elevational view of the thrust washer from the opposite side as compared to FIG. 11.

FIG. 13 is a transverse sectional view taken along section line 13—13 on FIG. 11 illustrating further structural details of the plastic thrust washer.

DESCRIPTION OF THE PREFERRED EMBODIMENT

Referring now specifically to the drawings, the water hydrant of the present invention is generally designated by reference numeral 20 and is shown installed in the vertical wall 22 of a building structure of any type with the hydrant 20 including a wall face place 24 oriented against the exterior surface of the wall 22 and closing an opening 26 through the wall 22 which receives the water hydrant with the face plate being secured to the wall 22 in any suitable manner or anchored in position in the opening 26 in any suitable manner. The face plate 24 includes a hollow tubular housing 28 which extends into the opening 26 and includes a hollow interior 30 which includes a laterally extending tubular head 32 terminating in an outwardly projecting hose connection 34 adjacent the lower end of a vertically installed generally rectangular face plate 24 as illustrated in FIGS. 1–3. Also, the housing 28 and the opening 30 include a tubular socket 36 that has an internally threaded outer end portion as at 38 for receiving a face nut 40 which is externally screw threaded into the internal screw threaded component 38 of the socket 36. The face nut 40 is provided with a pair of diametrically opposed notches 42 to receive a special wrench which will engage the notches 42 in order to rotate the face nut 40 during installation and/or removal of the face nut. The face nut 40 captively retains a valve operator 44 between the interior of the face nut 40 and an inwardly extending annular flange 46 at the inner end of the socket 36 as illustrated in FIGS. 2 and 3. The valve operator 44 is in the form of a circular disk having an O-ring groove 48 in its exterior surface which sealingly and rotatably engages the interior of the cylindrical socket 36. The end of the valve operator 44 which faces the inner surface of the face nut 40 includes a cylindrical projection 50 that has an internal socket 52 extending therethrough into the valve operator as illustrated in FIGS. 1 and 3 with the socket 52 being square to receive the square end 54 of a key 56 that has an operating handle 58 attached thereto and extending laterally to both sides of the longitudinal axis of the operating key 56. The handle 58 is provided with an opening 60 so that the key can be carried on a key ring or the like. The face nut 40 includes a central opening 62 which rotatably receives the cylindrical projection 50 as illustrated in FIG. 2 in order to properly maintain and capture the cylindrical valve operator 44 between the flange 46 and the inner surface of the face nut 40 with the cylindrical projection 50 and the square socket 42 thus being recessed inwardly of the outer face of the face nut 40 to protect and generally conceal the socket 42 so that only those persons with an operating key 56 can effectively manipulate the valve operator.

Extending rigidly from the casing or housing 28 received in the wall 22 is an elongated cylindrical casing 64 that is rigidly affixed to the casing 28 with the casing 28 including an internal flange 66 that limits the telescopic engagement of the casing 64 with the housing 28. The end of the casing 64 removed from the housing 28 is provided with a valve housing 68 which is in the form of a fitting having a telescopic relation to the casing 64 and a threaded axial extension 70 to which a supply pipe 72 is connected by either internal threading or external threading or by any other suitable connection by which a supply pipe can be connected to a valve housing or fitting which is in the form of a reducer-type pipe fitting. The type of connection between the supply pipe and the valve housing or reducer fitting is dependent upon the type of supply pipe available.

Extending between the valve operator 44 and the valve housing is an elongated actuator rod or tube 74 that includes a socket 76 at one end and a socket 78 at the other end with both sockets being square and tapered and formed by swaging the ends of the rod 74. As illustrated in FIG. 3, the valve operator includes a projection 80 telescopically and drivingly engaged with the socket 76 and at the other end of the actuating rod 74, there is a valve actuator generally designated by the numeral 82 that includes a projection 84 that is telescopically and drivingly connected with the socket 78. The valve actuator 82 is rotatably received in a valve body 86 that is screw threadedly engaged with the interior of the valve housing 68 as at 88 thus securing the valve body rigidly to the valve housing and thus rigidly to the casing 64 so that the valve body 86 and the valve actuator 82 will be rigidly held in alignment with the valve operator so that the actuating rod 74 can be utilized to transmit rotational movement of the valve operator caused by the operating key to the valve actuator 82 which can be angularly rotated in relation to the stationary valve body 86 which has an internal bore 90 rotatably supporting the valve actuator which is in the form of a short shaft or rod 92.

The valve body 86 is cylindrical and the bore 90 receives the shaft or rod 92 and a retaining ring 94 is positioned around the shaft or rod 92 and engages the end of the valve body 86 to retain the valve actuator 82 assembled with respect to the valve body. The actuator 92 includes the projection 84 that is telescopically received in the socket 78 to drivingly connect the operating rod 74 to the valve actuator 82. The other end of the valve actuator 82 includes a a flange 95 drivingly connected to a thrust washer 96 through a transverse projection 97. The flange 95 engages a shoulder 98 formed internally of the valve body 86 as illustrated in FIG. 4. The valve body 86 includes a radial recess 100 that extends for 45° or one-quarter turn as illustrated in FIG. 5 and the valve actuator 82 includes a radial stop member 102 integral therewith which is received in the arcuate recess 100 so that the valve actuator 82 including the shaft 92 can be rotated only one-quarter turn in relation to the valve body 86 and the other stationary components.

The thrust washer 96 includes a cylindrical disk provided with a transverse tongue 104 integral therewith on one surface which is received in a corresponding recess 106 in a rotatable ceramic disk 108. Disk 108 is generally cylindrical but includes flat opposed side surfaces at 110 which are flat and straight across a portion of the cylindrical exterior of the ceramic disk 108 so that the ceramic disk in plan has the appearance as illustrated in FIG. 7. Also, the surface of the ceramic disk 106 opposite to that having the recess 108 therein is provided with a pair of curved recesses 112, as shown in FIG. 8, which extend inwardly and longitudinally in a curved manner as illustrated in FIG. 8 with the plan configuration of the recesses 112 being illustrated in FIG. 7.

The rotatable ceramic disk 108 is in matching contacting engagement with a fixed cylindrical ceramic disk 114 which includes a pair of laterally extending lugs 116 received in recesses 117 in valve body 86 to anchor the stationary disk in relation to the valve body. The disk 114 includes a pair of generally triangular openings 118 extending therethrough which generally are the same shape as the triangular recesses 112 as illustrated in FIG. 7 so that when the triangular recesses 112 are in alignment with the triangular openings 118, a flow path for water is established through the ceramic disk assembly. However, when the rotatable ceramic disk 108 is rotated a quarter turn, flat surfaces 113 on the rotatable disk 108 will engage flat surfaces 115 on the rotatable ceramic disk 114. Since the surfaces 113 are larger than openings 118, the openings will be closed and the flow path closed. The flat ceramic surfaces that engage each other are lapped to provide a flat contacting surface that is self-lubricating and will not corrode and thus will not stick or become inoperative even during long periods of non-use.

The flow path is established from the supply pipe 72 through an opening 120 in the valve housing which also defines a flange against which the inner end of the valve body 86 is engaged when the valve body is screw threaded into the valve body 86. A silicone rubber seal 122 is positioned between the flange forming the opening 120 and a shoulder 124 on the valve body 86. The stationary ceramic disk is positioned against the silicone seal 122 as illustrated in FIG. 4. The valve body immediately adjacent the stationary ceramic disk 114 is provided with a pair of lateral openings 126 which are aligned with the outer curved end portion of the recesses 112 when they are aligned with the triangular openings 118 as illustrated in FIG. 4 so that the flow path goes through the opening 120, through the seal 122, through the openings 118 in the stationary ceramic disk 114, through the recesses 112 that are aligned with the openings 118 and thus out from the openings 126 and the valve body and into the annular space between the valve 86 and the casing 64 and the water then flows longitudinally in the casing 64 out through the tubular head 32 and hose connection 34. The flat straight edge portions 110 of the rotatable ceramic disk 108 will misalign with the openings 126 when the recesses 112 are misaligned with respect to the openings 118 so that the flat surfaces 113 on the disk 108 will engage with the flat surfaces 115 on the disk 114 peripherally of the openings 118 to provide a leak proof valve. The lateral stop 102 limits the rotational movement of the valve actuator rod 92 and thus the rotatable ceramic disk 108 which is rotated by the transverse axial projection 104 on the plastic thrust washer 96. The plastic thrust washer 96 includes a structure that incorporates the projection 104 on one surface thereof and includes an arcuate projection 105 along each edge thereof to partially engage the flattened surfaces 110 on the rotatable disk 108 to facilitate the driving connection therebetween. The other end or surface of the thrust washer 96 includes a cruciform shape of recess 107 which engages the corresponding projection 97 on the flange 95 on the valve actuator 82.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A water hydrant comprising an elongated tubular casing, a valve assembly located at one end of the casing, means at said one end of the casing for connection with a water supply pipe, said casing forming a flow path for water from the valve assembly to an outlet at the other end of the casing, valve operating means mounted on the casing at the other end thereof for remote manual actuation of the valve assembly and an elongated operating member extending coaxially in the casing and interconnecting the valve assembly and valve operating means, said valve assembly comprising a valve body having a portion anchored to the casing and a portion spaced concentrically from the casing, a stationary valve disk in said valve body, said valve body and stationary disk having openings therethrough in communication with the supply pipe and a rotatable valve disk having passageways and flat surfaces for selective alignment of the passageways with the openings and selective alignment of the flat surfaces with the openings to selectively open and close the openings for opening and closing the flow path, said valve body including lateral openings aligned with the passageways in the rotatable valve disk to establish a flow path to the interior of the casing when the rotatable valve disk is in open position, a valve actuator interconnecting the operating member and the rotatable valve disk for rotating the rotatable valve disk in response to rotational movement of the operating member, and means interconnecting the valve actuator and the valve body to limit the rotational movement of the actuator and rotatable valve disk.

2. The structure as defined in claim 1 together with a thrust washer interposed between the rotatable disk and valve actuator, said thrust washer being provided with drive connecting means between the valve actuator and thrust washer and between the thrust washer and rotatable disk, said thrust washer being constructed of plastic material having resilient properties to cushion shock forces imparted to the valve assembly when the valve assembly is moved from a fully open to a fully closed position thereby reducing "water hammer".

3. The structure as defined in claim 2 wherein said valve operating means includes a face plate at the other end of the casing remote from the valve assembly and engaging an external surface of a building wall, a face nut threaded into the face plate and the adjacent end of the casing, said casing including an annular flange spaced from the face nut and captively receiving a sealed, rotatable actuating member therein with the actuating member being detachably and drivingly connected to the operating member, said actuating member including a polygonal recess extending axially into the interior thereof for receiving an operating key to preclude unauthorized personnel from utilizing the water hydrant.

4. The structure as defined in claim 3 wherein said face plate includes a recessed central area with the recess receiving the key being spaced inwardly from the face plate to further enhance protection for the valve operating means.

5. The structure as defined in claim 4 wherein said means limiting movement of the valve actuator includes a radial stop member on said actuator, said valve body including an arcuate recess receiving the stop member with the recess extending through an angle of 90° to limit rotational movement of the valve actuator and rotatable disk to a quarter turn.

6. The structure as defined in claim 5 wherein each of said disks is constructed of ceramic material with the stationary disk including flat surfaces between the openings with the openings being diametrically arranged, the flat surfaces on both of the disks being lapped to provide smooth self-lubricated surfaces which will not become corroded or stuck during periods of infrequent or non-use.

7. In combination with a vertical building wall having an opening extending horizontally therethrough, a water hydrant comprising an elongated tubular casing extending inwardly from the opening in the building wall, a head on the end of the casing in the building wall with the head forming a closure for the opening in the building wall, a valve assembly at the end of the casing remote from the head, said casing and head including a flow passage therethrough with a hose connection integral with the head and communicated with the flow path, said valve assembly including an adapter for connection with a water supply pipe, said head including a key operated valve actuating member mounted thereon in spaced relation to the hose connection, said head and casing including a coaxially extending operating member from the valve actuating member to the valve assembly with the operating member being separably connected to both the actuating member and the valve assembly to enable remote actuation of the valve assembly from a position exteriorly of the building wall, said valve assembly including a stationary ceramic disk with at least one opening extending axially therethrough, a valve body mounting the stationary disk from the casing and in communication with the water supply pipe, a rotatable ceramic disk having an angulated passageway therein for alignment and misalignment with the opening in the stationary valve disk, said valve body including opening means communicating the passageway in the rotatable valve disk with the interior of the casing to form a flow path through the valve assembly which is selectively closed and opened upon rotatable movement of the valve disk, a rotatable valve actuator mounted on the valve body and detachably connected to the operating member and a resilient thrust washer interconnecting the actuator and the rotatable valve disk with the thrust washer being contained within said valve body and having a perimeter substantially coincidental to the valve disk, and means limiting rotary movement of the rotary valve disk with the means for such limiting being disposed on said actuator thereby limiting the rotatable movement of the thrust washer and rotatable valve disk.

8. The structure as defined in claim 4 together with a resilient annular seal interposed between the stationary valve disk and the valve assembly to form a seal therebetween to eliminate passage of water between the valve body and the valve assembly, said valve assembly including a valve housing rigidly connected to the casing and rigidly connected to the supply pipe.

* * * * *